United States Patent [19]

Campbell et al.

[11] Patent Number: 4,491,779
[45] Date of Patent: Jan. 1, 1985

[54] MOTOR VEHICLE ELECTRICAL SYSTEM

[75] Inventors: Robert W. Campbell; Donald O. Ruff, both of Anderson, Ind.

[73] Assignee: General Motors Corporation, Detroit, Mich.

[21] Appl. No.: 541,242

[22] Filed: Oct. 12, 1983

[51] Int. Cl.³ .............................. H02J 7/14; H02J 7/24
[52] U.S. Cl. .......................................... 320/6; 320/17; 320/57; 322/90
[58] Field of Search ................... 320/6, 15, 16, 17, 59, 320/61, 57; 322/89, 90

[56] References Cited

U.S. PATENT DOCUMENTS

| | | | |
|---|---|---|---|
| 3,427,529 | 2/1969 | Cummins et al. | 320/15 |
| 3,624,480 | 11/1971 | Campbell et al. | 320/15 |
| 3,809,995 | 5/1974 | Hardin | 320/17 X |
| 4,041,363 | 8/1977 | Scheider | 320/15 |
| 4,044,293 | 8/1977 | Follmer | 320/17 X |
| 4,047,088 | 9/1977 | Himmler | 320/17 X |
| 4,179,647 | 12/1979 | Cummins et al. | 320/17 X |

Primary Examiner—R. J. Hickey
Attorney, Agent, or Firm—C. R. Meland

[57] ABSTRACT

A multivoltage electrical system for a motor vehicle that has a pair of storage batteries which, in a first charging mode are charged in series from the direct voltage output terminals of a bridge rectifier connected to an alternating current generator. In a second charging mode, only one of the batteries is charged and this takes place when a plurality of controlled rectifiers connecting the generator and a common junction of the batteries are gated conductive. The switching between modes is a function of the voltage of one of the batteries and the voltage of a triangular voltage waveform generator operating at a fixed frequency. The system is maintained in the second mode when generator speed is below a predetermined value.

7 Claims, 8 Drawing Figures

Fig.1

12 VOLT CHARGING MODE

Fig.2

24 VOLT CHARGING MODE

MOTOR VEHICLE ELECTRICAL SYSTEM

This invention relates to a multivoltage motor vehicle electrical system and more particularly to a motor vehicle electrical system that is capable of providing first and second load supply voltages referenced to ground and a third voltage corresponding to the sum of the first and second voltages.

Battery charging systems for motor vehicles that have two series connected batteries are known in the prior art, one example being the system disclosed in the U.S. Pat. No. 3,624,480 to Campbell et al. In that patent two batteries are connected in series and in one charging mode, the two batteries are charged in series from the direct voltage output terminals of a bridge rectifier that is energized by the polyphase output winding of an alternating current generator. In another charging mode only one of the two batteries is charged and this is accomplished by gating a plurality of controlled rectifiers conductive that are connected between the polyphase output winding of the generator and a common junction of the two batteries.

One of the differences between the system of this invention and that disclosed in the above-referenced Campbell et al. patent is the manner in which the system switches from one charging mode to the other. In the Campbell et al. patent the system is switched to a mode where only one battery is charged whenever the voltage of the other battery exceeds a predetermined value. In accordance with one aspect of this invention the switching between modes takes place at a fixed frequency with the time periods of the modes being variable. This is accomplished by comparing the output voltage of a fixed frequency ramp voltage generator with a voltage that is a function of the voltage across one of the batteries. It accordingly is an object of this invention to provide a battery charging system in which two batteries are charged in series in one charging mode and only one battery is charged in another charging mode and wherein the switching between modes occurs at a constant frequency and with variable time periods for the respective charging modes.

Another object of this invention is to provide a battery charging system wherein two batteries are charged in series in first mode of operation and only one of the two batteries is charged in a second mode of operation and wherein the system is maintained in the second mode until the speed of the generator that supplies charging current to the batteries exceeds a predetermined value.

Another object of this invention is to provide a battery charging system of the type described wherein the two batteries are connected to a common junction that is at the electrical ground potential of the motor vehicle electrical system. With this arrangement the system is capable of providing a positive voltage which is referenced to ground, a negative voltage which is referenced to ground and a third voltage which corresponds substantially to the sum of the first and second voltages. By way of example, where two 12 volt batteries are utilized the system will provide a positive 12 volts referenced to ground, a negative 12 volts referenced to ground and 24 volts across both batteries.

Still another object of this invention is to provide a battery charging system of the type described which includes a voltage regulator connected to the field winding of the generator to control field current and operating to sense the voltage across one of the two batteries of the system. The system is arranged such that a plurality of diodes are utilized to develop a field energizing voltage and is further arranged such that one of the batteries is capable of supplying field current to the field winding through a diode so that sufficient field current is available when the system switches between a mode wherein only one battery is charged to a mode wherein the two batteries are charged in series.

Figure 1:
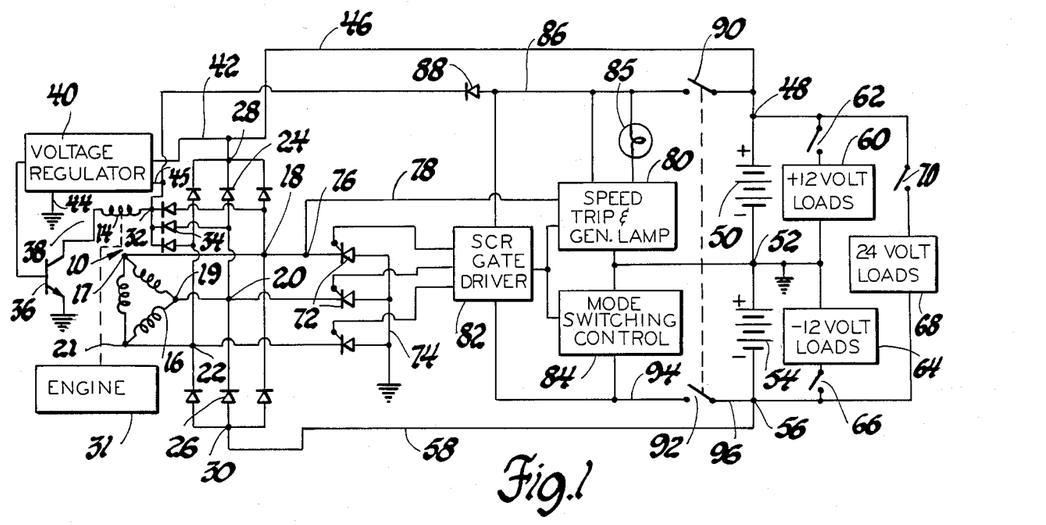
FIG. 1 is a schematic circuit diagram partially in block diagram form illustrating a motor vehicle electrical system made in accordance with this invention.

Referring now to the drawings and more particularly to FIG. 1, the reference numeral 10 generally designates an alternating current generator which has a field winding 14 and a three phase Delta connected output winding 16. The phase terminals 17, 19 and 21 of the output winding 16 are respectively connected to the AC input terminals 18, 20 and 22 of a three phase full-wave bridge rectifier circuit comprised of three positive diodes 24 and three negative diodes 26. The cathodes of diodes 24 are connected together and to a positive direct voltage output terminal 28. The anodes of the diodes 26 are connected together and to another negative direct output terminal 30 of the bridge rectifier.

The field winding 14 of the alternating current generator is carried by the rotor of the generator in a manner well known to those skilled in the art and the rotor is driven by the engine 31 of the vehicle, as illustrated by the dotted line in FIG. 1. The drive between the engine 31 and the generator 10 is by way of a belt and pulleys and generator speed varies with engine speed as is well known to those skilled in the art. One end of the field winding 14 is connected to a junction 32 which in turn is connected to the cathodes of three diodes 34. The anodes of the diodes 34 are connected respectively with the AC input terminals of the bridge rectifier and therefore to the phase terminals of the three phase winding 16. The opposite end of the field winding 14 is illustrated as being connected to the collector of an NPN transistor 36, the emitter of which is grounded, as illustrated. The transistor 36 forms part of a voltage regulator generally designated by reference numeral 38 and including voltage regulator circuitry shown as a block and designated by reference numeral 40. The voltage regulator is of a known construction and can be of the type, for example disclosed in the U.S. Pat. No. 3,597,654 to Harland et al.

As disclosed in the above-referenced Harland et al. patent, the transistor 36 can be comprised of a pair of Darlington connected transistors which switch on and off to control field current. The circuit for energizing the field 14 is from junction 32, through field winding 14 and through the collector-emitter circuit of the switching transistor 36 to ground.

The circuitry within the block 40 is coupled to the base of transistor 36 to cause this transistor to switch on and off in accordance with the voltage sensed by the voltage regulator. The voltage regulator has a voltage divider of the type described in the above-referenced Harland et al. patent that is connected between conductor 42 and grounded conductor 44. The voltage regulator circuitry further is coupled to junction 32 by conductor 45 to provide an input voltage to the circuitry contained within block 40.

The direct voltage output terminal 28 is connected to a conductor 46 which in turn is connected to junction 48. The junction 48 is connected to the positive terminal of a 12 volt storage battery designated by reference numeral 50. The negative side of the battery 50 is connected to junction 52 and this junction is grounded as illustrated. The positive terminal of another 12 volt storage battery 54 is connected to junction 52 and the negative terminal of battery 54 is connected with junction 56. The junction 56 is connected to the negative direct voltage output terminal 30 of the bridge rectifier via a conductor 58.

The reference numeral 60 designates a 12 volt motor vehicle electrical load. When switch 62 is closed the electrical load 60 is connected with junctions 48 and 52 and therefore across battery 50. The reference numeral 64 designates another 12 volt motor vehicle electrical load and when switch 66 is closed the load 64 is connected to junctions 52 and 56 and therefore across the battery 54. The reference numeral 68 designates a 24 volt electrical load and when switch 70 is closed the 24 volt load 68 is connected to junctions 48 and 56 and therefore across batteries 50 and 54. It will be appreciated that the circuit arrangement that has been described provides a positive 12 volts referenced to ground via battery 50 and a negative 12 volts referenced to ground via battery 54. The system further provides 24 volts to the 24 volt load 68.

The system of FIG. 1 has three silicon controlled rectifiers, each designated by reference numeral 72. The anodes of these controlled rectifiers are all connected to a conductor 74 which is grounded. The cathodes of controlled rectifier 72 are connected respectively to the AC input terminals 18, 20 and 22 of the bridge rectifier and hence to the phase terminals 17, 19 and 21 of generator output winding 16. The cathode of one of the controlled rectifiers is connected to a junction 76 which in turn is connected to a conductor 78. The conductor 78 is connected to a circuit shown as block 80 which is a speed trip and generator control lamp circuit that will be described in detail hereinafter.

The gates of the controlled rectifiers 72 are connected to a controlled rectifier gate driver circuit 82. The gate driver circuit 82 is connected to a mode switching control circuit 84 and to the speed trip and generator lamp control circuit 80. A generator charge indicator or warning lamp 85 is connected between the circuit 80 and a conductor 86. The conductor 86 is connected to the anode of a diode 88, the cathode of which is connected to junction 32.

The system of FIG. 1 includes a pair of switches 90 and 92 which are closed whenever the ignition switch on the motor vehicle is in a position to energize the engine ignition system. One side of the switch 90 is connected to conductor 86 and the opposite side of this switch is connected to conductor 46 and junction 48.

One side of the switch 92 is connected to conductor 94 and the opposite side of this switch is connected to junction 56 via conductor 96.

Figure 2:
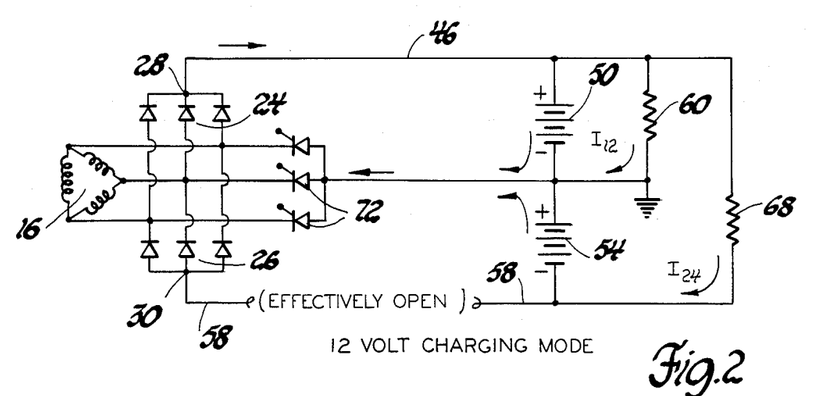
FIGS. 2 and 3 are simplified electrical circuits that illustrate certain battery charging modes of operation of the system illustrated in FIG. 1.

The battery charging system illustrated in FIG. 1 is capable of charging the two 12 volt batteries 50 and 54 in series which will hereinafter be called the 24 volt charging mode. The electrical system is further capable of charging only the 12 volt battery 50 which will hereinafter be called the 12 volt charging mode. In the 12 volt charging mode the controlled rectifiers 72 are conductive. When controlled rectifiers 72 are conductive, anode to cathode, the 12 volt battery 50 can be charged from a circuit that can be traced from direct voltage output terminal 28, through conductor 46 to junction 48, through battery 50 to grounded junction 52 and then via ground to conductor 74 and the anode-cathode circuits of controlled rectifiers 72. A simplified equivalent circuit for the 12 volt charging mode is illustrated in FIG. 2. Thus, as shown in FIG. 2, when controlled rectifiers 72 are gated conductive the conductor 58 is effectively opened. During this 12 volt charging mode, and assuming continuous duty electrical loads, the battery 50 is being charged and power is supplied to the loads as shown by currents depicted by arrows in FIG. 2. The current identified as $I_{12}$ is the current being supplied to the 12 volt load 60 and the current identified as $I_{24}$ is the current being supplied to the 24 volt load 68. Current $I_{24}$ is in a direction to discharge the battery 54.

Figure 3:
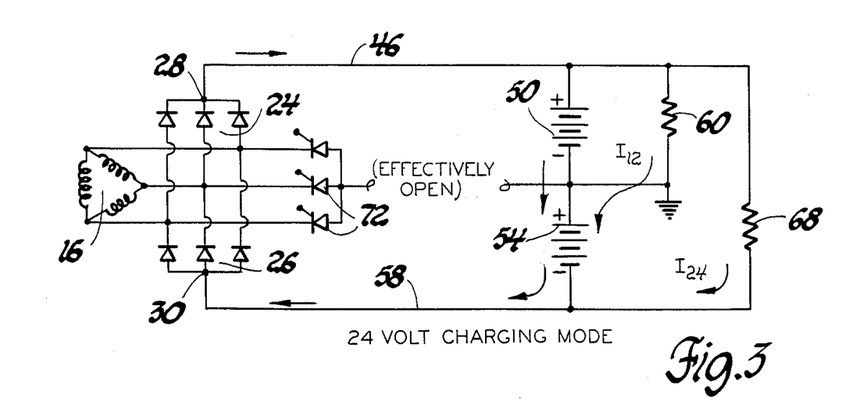

The system operates in the 24 volt charging mode when the controlled rectifiers 72 are not conducting. The simplified equivalent circuit, for this mode of operation, is depicted in FIG. 3 where the arrows again indicate current flow. In the 24 volt charging mode the circuit between conductor 74 and grounded junction 52 is effectively opened since controlled rectifiers 72 are not conductive. During this mode of operation the batteries 50 and 54 are charged in series from the direct voltage output terminals 28 and 30 of the bridge rectifier. The generator supplies charging current to battery 50 and supplies load currents identified as $I_{12}$ and $I_{24}$. In this mode battery 54 is charged at a rate equal to the sum of current $I_{12}$ plus the current supplied to battery 50.

As will be more fully described hereinafter, the system is switched between the 12 and 24 volt charging modes by applying or removing gate drive signals to the gates of the controlled rectifiers 72.

Figure 4:
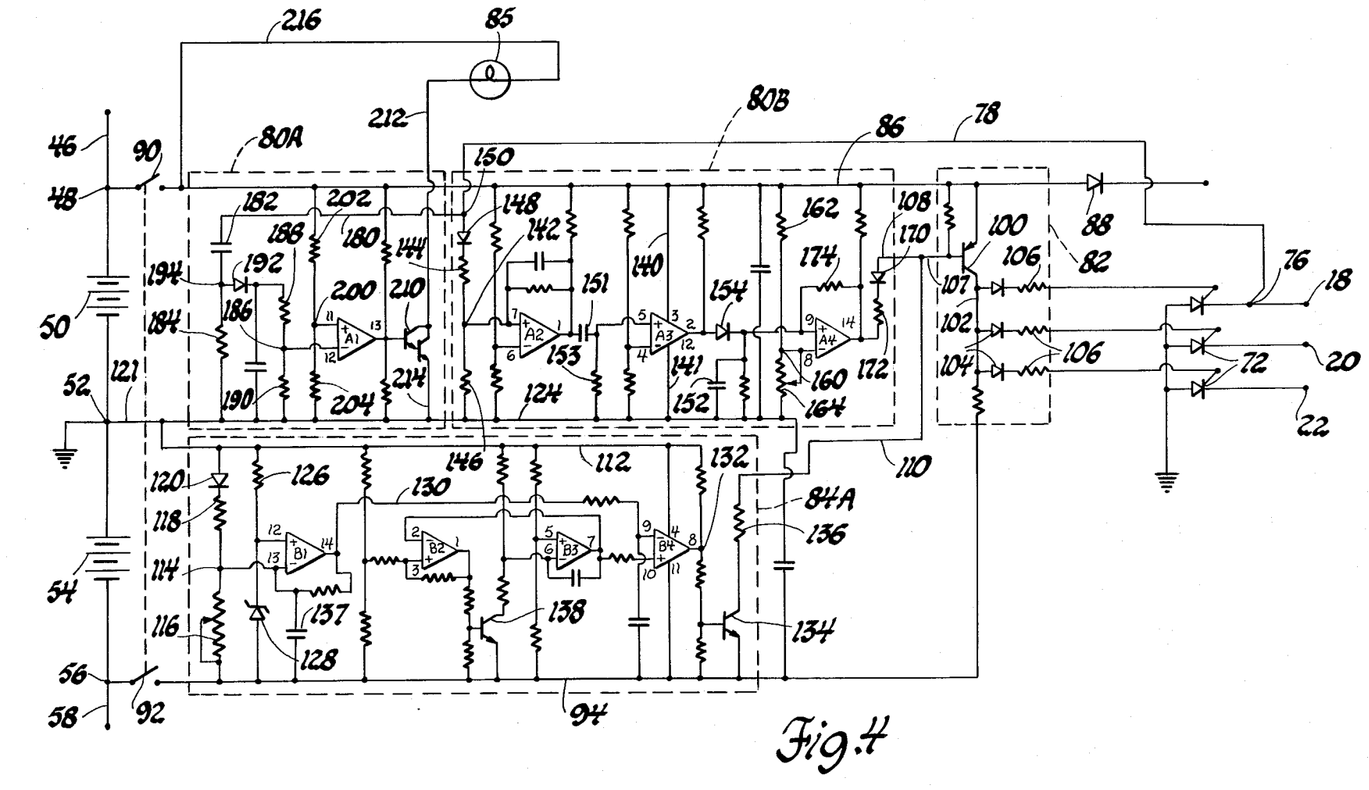
FIG. 4 is a schematic circuit diagram of circuitry that is utilized in the system illustrated in FIG. 1.
Figure 5:
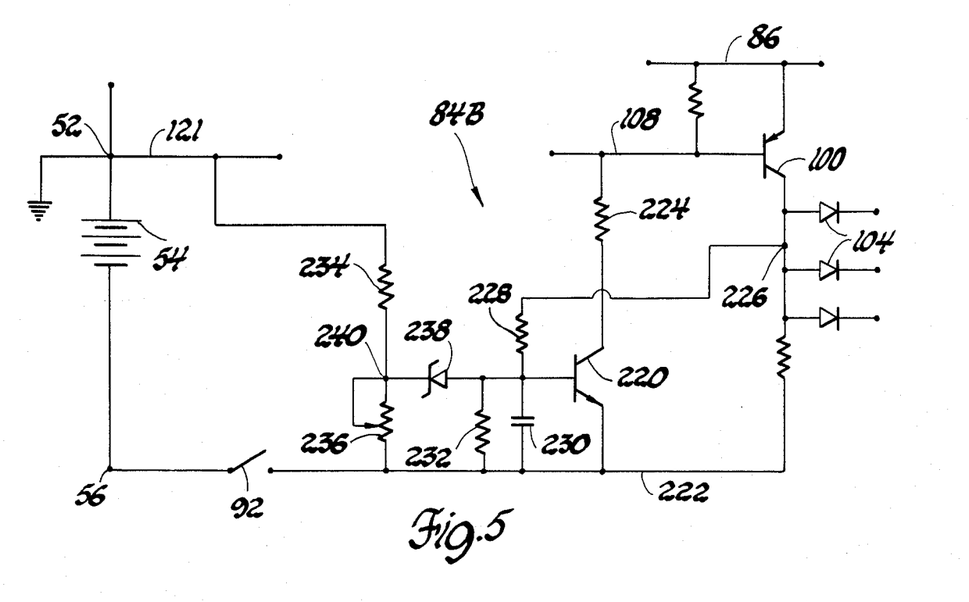
FIG. 5 is a schematic circuit diagram of a modification that can be made to the system illustrated in FIG. 4.

Referring now more particularly to FIG. 4, a circuit diagram is illustrated which illustrates in detail specific circuitry for the blocks illustrated in FIG. 1. In FIG. 4 the same reference numerals have been utilized as were utilized in FIG. 1 to identify corresponding circuit elements. In FIG. 4 the reference numeral 82 again designates the controlled rectifier gate driver circuit. This circuit includes a PNP transistor 100 having an emitter connected to conductor 86 and a collector connected to conductor 102. The conductor 102 is connected to the anodes of three diodes, each designated by reference numeral 104. The cathodes of the diodes 104 are connected respectively to the gate electrodes of controlled rectifiers 72 via resistors 106. The base of transistor 100 is connected to a conductor 107 and this conductor is connected to conductors 108 and 110. A resistor is connected across the emitter and base electrodes of transistor 100 as illustrated. Whenever the transistor 100 is biased conductive in its emitter-collector circuit the direct voltage on conductor 86 is applied to each gate electrode of the controlled rectifiers 72 to cause these controlled rectifiers to be gated conductive. The transistor 100 will be biased conductive when the voltage on conductor 108 or conductor 110 drops to a value permitting sufficient base current to flow to bias the transistor 100 conductive. The voltage on conductor 108 is controlled by the speed trip circuit 80 which in its detailed FIG. 4 form is designated by reference numeral 80B. The voltage on conductor 110 is controlled by the mode switching control circuit 84 and the specific form of this circuit is designated by reference numeral 84A in FIG. 4. The mode switching control circuit 84 can take two forms. In FIG. 4 the mode switching control circuit, as designated by reference numeral 84A, is a fixed frequency variable pulse width circuit. The mode switching control 84 can alternatively be a load determined load switching control which is illustrated in FIG. 5 and generally designated as 84B. The circuit of FIG. 4 will be described first as including the fixed frequency mode switching control 84A.

The mode control 84A comprises a quad operational amplifier comprised of four sections designated respectively B1, B2, B3 and B4. This device may be a National Semiconductor LM-124 quad operational amplifier or equivalent. In FIG. 4 reference numerals adjacent the sections of the operational amplifiers designate the terminals of the respective amplifiers when utilizing the LM-124 device. In regard to the power supply for these operational amplifier sections, the terminals 4 and 11 of amplifier B4 are shown connected respectively to grounded conductor 112 and conductor 94. The remainder of the power supply connections for amplifiers B1, B2 and B3 have not been illustrated but would be connected the same as the connection for amplifier section B4.

Figure 6:
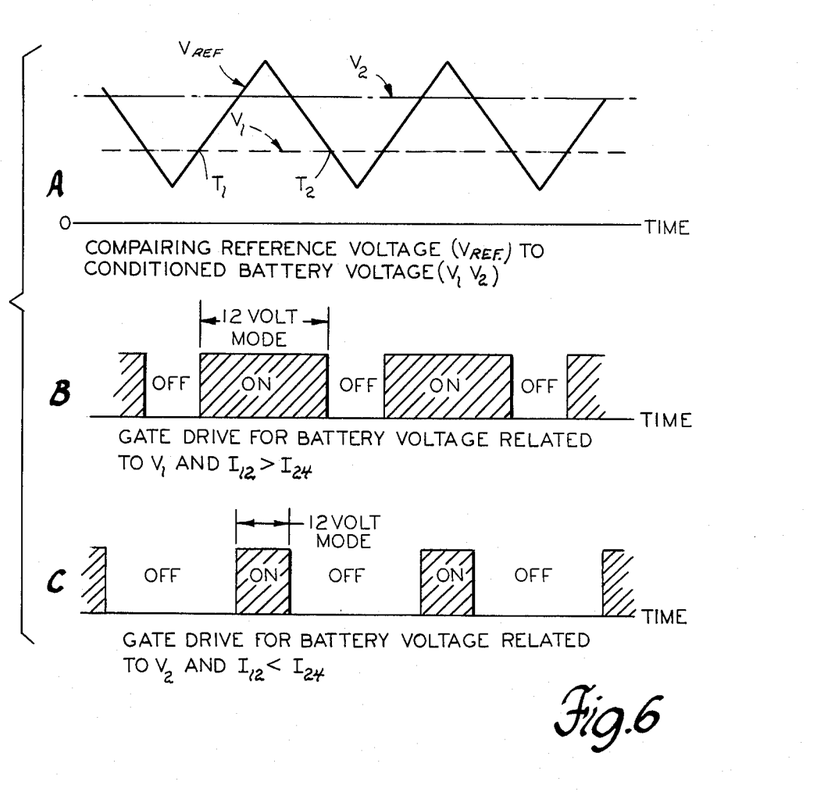
FIG. 6 illustrates waveforms which relate to the operation of the system shown in FIG. 4.

The negative terminal of amplifier B1 is connected to a junction 114 located between potentiometer resistor 116 and a resistor 118. A diode 120 is connected between resistor 118 and conductor 112. The conductor 112 is connected to a grounded conductor 121. The positive terminal of amplifier B1 is connected to conductor 112 via resistor 126. A Zener diode 128 is connected in series with resistor 126 and between the positive terminal of amplifier B1 and conductor 94. The output of amplifier B1 is connected to the negative terminal of amplifier B4 via a conductor 130. The positive terminal of amplifier B4 is connected to the output of amplifier B3 and the output of amplifier B4 is connected to a junction 132. The junction 132 is connected via a resistor to the base of an NPN transistor 134. The emitter of this transistor is connected to conductor 94 and the collector of this transistor is connected to conductor 110 via resistor 136. The amplifiers B2 and B3 and associated circuitry connected thereto, including the NPN transistor 138, form a ramp voltage generator which generates a ramp voltage of constant frequency designated as $V_{REF}$ in FIG. 6A. This ramp voltage is applied to the positive terminal of amplifier B4 and is compared to the voltage applied to the negative terminal of amplifier B4. The voltage applied to the negative terminal of amplifier B4 is a conditioned and filtered representation of the voltage across battery 54 and this is accomplished by the circuitry connected to battery 54 including amplifier B1 and capacitor 137. The conditioned voltage applied to the positive terminal of amplifier B4 will vary as the voltage across battery 54 varies and, as an aid in explaining the operation of this invention, two conditioned voltage levels $V_1$ and $V_2$ that represent the voltage of battery 54 are illustrated in FIG. 6A. These are only two of many conditioned voltage levels that may exist, dependent upon the voltage of battery 54. If it is assumed that the voltage across battery 54 is of such a magnitude as to produce conditioned voltage $V_1$ the triangular voltage waveform produced by the ramp voltage generator (B2 and B3) and applied to terminal 10 of B4 will exceed $V_1$ at time periods identified as $T_1$ and $T_2$ in FIG. 6A. Thus, during the time period from $T_1$ to $T_2$ the triangular voltage applied to the positive terminal of amplifier B4 exceeds the reference voltage $V_1$ applied to the negative terminal of amplifier B4 with the result that the output on amplifier B4 biases NPN transistor 134 conductive. With transistor 134 conductive base current for transistor 100 can flow through the collector-emitter circuit of transistor 134 with the result that transistor 100 is biased conductive to thereby gate controlled rectifiers 72 conductive. The gate drive signal, under this condition of operation that is applied to the gates of controlled rectifiers 72, is illustrated in FIG. 6B. Thus, the cross hatched square waves also identified as on are indicative of the gate drive signal applied to controlled rectifiers 72 and are also indicative of the time period that the system is operating in the 12 volt charging mode, that is where only battery 50 is being charged. The off periods, shown in FIG. 6B, correspond to the periods of time in which the system is operating in the 24 volt charging mode and in FIG. 6B it has been assumed that current $I_{12}$ is greater than current $I_{24}$ as they are depicted in FIGS. 2 and 3.

If it is assumed that the voltage across battery 54 produces conditioned voltage $V_2$, which is applied to the negative terminal of amplifier B4, and that current $I_{12}$ is less than current $I_{24}$ the gate drive signal to the controlled rectifiers 72 will be as depicted in FIG. 6C where again the cross hatched square waves, designated as on, are the periods of time that the controlled rectifiers are gated conductive and also the periods of time that the system is operating in the 12 volt charging mode. It can be seen, from a comparison of FIGS. 6B and 6C, that the time periods that the system is operating in the 12 volt charging mode is decreased in FIG. 6C from the corresponding time periods of FIG. 6B. The system thus provides a constant frequency switching system for switching between the 12 and 24 volt charging modes but with variable time periods for the respective modes as depicted in FIGS. 6B and 6C.

The generator lamp circuit 80A and the speed trip circuit 80B, illustrated in FIG. 4, use sections of a National Semiconductor LM-139 quad comparator or equivalent. These sections are designated respectively as A1, A2, A3 and A4. The reference numerals adjacent the comparator sections designate terminals for an LM-139 quad comparator. The power supply for the section A3 is achieved by connecting terminal 3 to conductor 86 via conductor 140. Terminal 12 of section A3 is connected to conductor 124 by conductor 141. The conductor 124 is grounded since it is connected to conductor 121. It is to be understood that the other sections of the quad comparator are similarly connected in regard to power supply.

The purpose of the speed trip circuit 80B is to cause the system to operate in the 12 volt charging mode to charge only battery 50 whenever generator rotor speed is below some predetermined value. Thus, at low engine speeds, particularly at idle, the generator 10 cannot supply as much current in the 24 volt mode as it can in the 12 volt mode. It is preferable to leave the generator in the 12 volt mode at low engine speeds in order to effectively utilize the output that the generator is capable of developing at low speeds.

The positive terminal of comparator section A2, of the speed trip circuit 80B, is connected to a junction 142 located between resistors 144 and 146. These resistors are connected in series with a diode 148 which in turn is connected in series with conductor 78. A junction 150 connected to conductor 78 feeds the generator lamp circuit 80A which will be described in detail hereinafter. The voltage applied to conductor 78 is the voltage at the AC input terminal 18 of the bridge rectifier and is an alternating voltage, the frequency of which is a function of generator speed and hence vehicle engine speed. This voltage is applied to the positive terminal of the comparator A2 which develops a square wave voltage at its output. The output of A2 is differentiated by capacitor 151 and resistor 153 to obtain a constant pulse width voltage which is then amplified and squared by section A3 of the comparator. This output voltage of A3 is applied to capacitor 152 by the circuit that includes diode 154. The capacitor 152 is charged by the output voltage pulses of comparator section A3 and the voltage on the capacitor is therefore proportional to engine and generator speed. This speed voltage is applied to the positive terminal of comparator section A4 which operates to compare the voltage on junction 160 with the generator speed voltage. The voltage at junction 160 is a reference voltage developed by a voltage divider comprised of a resistor 162 and a potentiometer resistor 164. As long as the speed voltage is less than the reference voltage on junction 160 the output of comparator section A4 will cause the transistor 100 to conduct which causes the controlled rectifiers 72 to be gated conductive which in turn places the system in the 12 volt charging mode. Thus, as long as engine and generator speed are below some value the output of comparator section A4 is low providing a path for base current via diode 170 and resistor 172 to bias transistor 100 conductive.

When engine and generator speed exceed some value the output of comparator section A4 goes high biasing transistor 100 nonconductive. The transistor 100, however, after this occurs can be biased conductive when the voltage on conductor 110 goes low. The voltage on conductor 110, as previously described, is controlled by the mode switching control 84A.

In summary, the speed trip circuit 80B will always force the system to operate in the 12 volt charging mode as long as engine and generator speed are below some predetermined value and this will occur regardless of the mode that is being selected by the mode switching control 84A.

By way of example, the speed trip circuit 80B may be tripped to cause the system to be controlled by the mode control 84A when generator rotor speed reaches 2400 rpm. Once the trip point has been exceeded, the forced 12 volt mode will not occur again until generator speed decreases to a lower speed, for example, 2100 rpm. This hysteresis feature is obtained by the use of a feedback resistor 174 that connects the output of comparator section A4 to the positive input terminal of this comparator section. The purpose of this hysteresis feature is to prevent the output of comparator section A4 from turning on and off rapidly, if the generator speed would happen to stay at the trip speed of 2400 rpm for a period of time where ripple on the speed voltage signal or power source could make the comparator section A4 switch at the ripple frequency.

The purpose of the generator lamp control circuit 80A is to cause the generator tell-tale or warning lamp 85 to light in the event that the generator and rectifying apparatus are not developing a voltage of sufficient magnitude. This circuit includes a conductor 180 connected to junction 150 and therefore to terminal 18 of the bridge rectifier via conductor 78. Connected between conductor 180 and conductor 124 is a capacitor 182 and a resistor 184. The negative terminal of comparator A1 is connected to a junction 186 located between resistors 188 and 190. A capacitor is connected in parallel with these resistors. The resistors 188 and 190 are connected in series with a diode 192 that is connected to junction 194.

The alternating voltage at junction 18 is coupled to junction 194 by the capacitor 182 and is half-wave rectified by diode 192. The magnitude of the voltage at junction 186 therefore represents the magnitude of the output voltage of the alternating current generator 10. The voltage at junction 186 is compared with the voltage at junction 200 which is developed by a voltage divider comprised of resistors 202 and 204 connected across conductors 86 and 124. When the output voltage of the generator reaches a normal value, the output of amplifier section A1 biases the Darlington connected NPN transistors 210 nonconductive. It can be seen that the collector-emitter circuit of the Darlington connected transistors are connected in series with the lamp 85 via conductors 212 and 214. The lamp is connected with conductor 86 via conductor 216. Thus, when generator voltage is normal Darlington connected resistors 210 are biased nonconductive and the generator tell-tale lamp is not lit.

When generator voltage is abnormally low the voltage at junction 186 is low and as a consequence the comparator section A1 biases Darlington connected transistors 210 conductive. Accordingly, the lamp 85 is lit, indicative of a low or no voltage output of the alternating current generator 10.

It will be appreciated from the foregoing that the voltage on conductor 78 performs two functions in the system. First of all, the frequency of this voltage is utilized as an indication of generator speed in order to control the tripping of the speed trip circuit 80B. The other function of the voltage on conductor 78 is to control the energization of signal lamp 85 and in this regard the amplitude or magnitude of the voltage on conductor 78 is utilized for this purpose.

As previously mentioned, the mode switching control 84 can be of the fixed frequency type, shown in FIG. 4, or can be of the so-called load determined type. The fixed frequency type of control has already been described in connection with FIG. 4 and in FIG. 4 is identified by reference numeral 84A. The load determined type of control is illustrated in FIG. 5 and identified as 84B. When it is desired to utilize the load determined type of control the circuit of FIG. 4 is modified by completely eliminating the circuitry identified as 84A and connecting the circuit 84B of FIG. 5 to the FIG. 4 circuit in a manner illustrated in FIG. 5. Thus, in FIG. 5 the same reference numerals have been utilized as were utilized in FIG. 4 in order to illustrate how the FIG. 5 circuit is connected to the FIG. 4 circuit, assuming of course that the circuitry 84A has been eliminated.

The load determined circuitry 84B comprises an NPN transistor 220 having an emitter connected to a conductor 222. The conductor 222 is connected to junction 56 whenever switch 92 is closed. The collector of transistor 220 is connected with a resistor 224 and this resistor is connected to conductor 108. The base of transistor 220 is connected to a junction 226 via resistor 228. A capacitor 230 and a resistor 232 are connected across the base and emitter electrodes of transistor 220. A voltage divider comprised of a resistor 234 and a potentiometer resistor 236 is connected between conductors 121 and 222 and therefore across battery 54. A Zener diode 238 is connected between the base of transistor 220 and the junction 240 of the voltage divider.

The operation of the circuit of FIG. 4, assuming that the circuit 84B is the mode switching control, will now be described. The circuit 84B responds to the magnitude of the voltage at junction 52. Assuming that the system is in the 24 volt charging mode the batteries 50 and 54 are charged in series and the voltage at junction 52 will increase at the instant the 24 volt charging mode is initiated. As this voltage increases it will eventually attain a value sufficient to cause the Zener diode 238 to conduct in a reverse direction to thereby bias transistor 220 conductive. When transistor 220 is biased conductive it provides a path for base current for transistor 100 thereby causing transistor 100 to conduct. The conduction of transistor 100 applies gate signals to the gate electrodes of controlled rectifiers 72 causing the controlled rectifiers to conduct and placing the system in the 12 volt charging mode.

With the system in the 12 volt charging mode the voltage at junction 52 decreases and will decrease to a point in which the Zener diode 238 resumes its blocking state thereby biasing transistor 220 nonconductive. This causes the transistor 100 to be in a nonconductive state thereby removing the gate drive to the controlled rectifiers 72 and placing the system back into the 24 volt charging mode. The system therefore operates to continuously switch between the 12 and 24 volt charging modes in response to variation in the voltage of junction 52.

Figure 7:
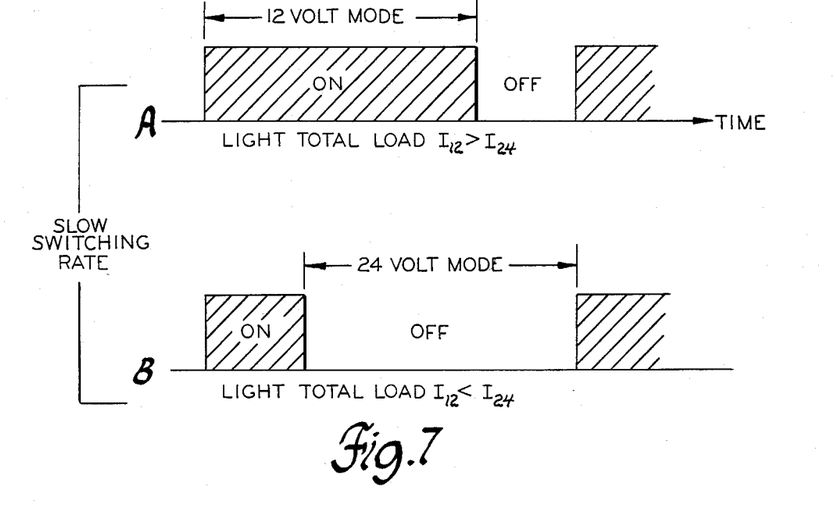
FIGS. 7 and 8 are waveforms which relate to the operation of the modification shown in FIG. 5.
Figure 8:
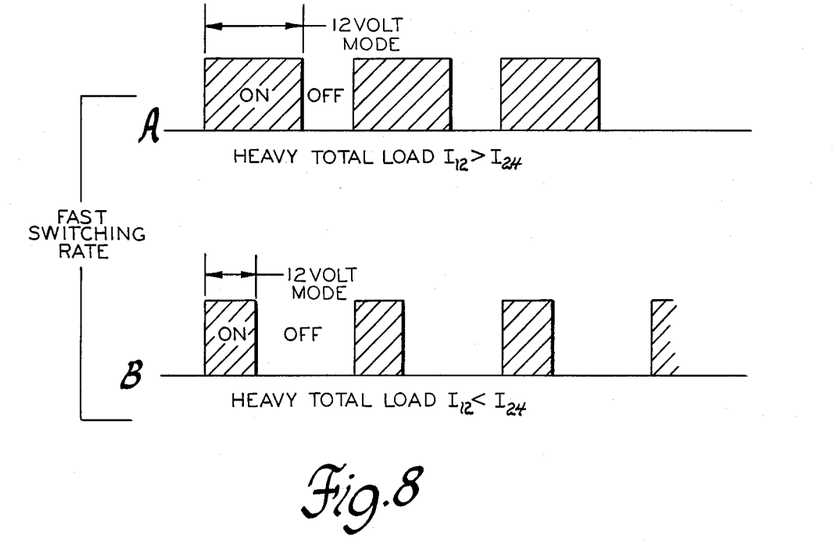

FIGS. 7 and 8 illustrate waveforms of the gate drive voltage applied to the gate electrodes of controlled rectifiers 72 for various load conditions when the system of FIG. 5 is utilized. FIG. 7A illustrates a condition in which $I_{12}$ is greater than $I_{24}$ and FIG. 7B illustrates a condition in which $I_{12}$ is less than $I_{24}$, these currents corresponding to the currents identified by the arrows shown in FIGS. 2 and 3. FIG. 8 illustrates relatively heavy total load conditions which causes the switching rate to increase. FIG. 8A illustrates a condition in which $I_{12}$ is greater than $I_{24}$ and FIG. 8B illustrates a condition in which $I_{12}$ is less than $I_{24}$.

The rate at which the voltage builds up and decays across battery 54 and accordingly the voltage at junction 52 will determine the basic switching frequency of the system. This rate is in turn a function of the 12 and 24 volt loads. Thus, the switching action is load determined. When the loads are very light (FIG. 7) the voltage of battery 54 changes slowly and the switching frequency is low. When the loads are heavy (FIG. 8) voltage changes rapidly and the switching frequency increases. The switching rate may be, for example, typically 5 hertz with the conditions of operation illustrated in FIG. 7. During a heavy load condition (FIG. 8) the switching frequency may be typically 50 to 100 hertz.

The operation of the voltage regulator 38, in controlling field current and hence system voltages, will now be described. The voltage regulator, as previously described, includes a battery voltage sensing circuit connected between conductor 42 and ground which is comprised of a voltage divider network, as disclosed in the above-referenced Harland et al. patent. This voltage sensing circuit senses the voltage across battery 50 and therefore develops a voltage which is a function of the voltage across battery 50. The voltage regulator is arranged such that when the voltage across battery 50 is above some predetermined value the field controlling transistor 36 is switched nonconductive, and when the voltage across battery 50 drops to some predetermined value the field controlling transistor 36 is switched conductive. The magnitude of the battery voltage that will cause the transistor 36 to switch nonconductive may be, for example, 13.5 volts where the battery 50 has a rated terminal voltage of 12 volts. Assuming this to be the case, the voltage regulating transistor 36 would switch off when the voltage across battery 50 exceeds 13.5 volts and switches back on when this voltage drops below 13.5 volts.

It should be noted that even though the voltage regulator 38 responds to, for example, a 13.5 volt trip point, the actual output voltage appearing between output terminals 28 and 30 of the bridge rectifier may be, for example, 27 volts when the system is operating in the so-called 24 volt mode, that is, where the bridge rectifier is charging the batteries 50 and 54 in series. When controlled rectifiers 72 are biased conductive to place the system in the 12 volt charging mode, the output voltage appearing between junction 28 and the grounded anodes of the controlled rectifiers may be, for example, 13.5 volts since the voltage regulator 38 cuts back the average field current to provide the 13.5 volts. From the foregoing it can be seen that the voltage generated by the output winding 16 is about twice as much when the system is operating in the so-called 24 volt mode, as compared to the voltage generated in the output winding 16 when the system is operating in the so-called 12 volt mode. This is accomplished by the voltage regulator 38 which responds only to the voltage across the battery 50.

The purpose of the diode 88 is to ensure adequate field current when the system is being switched from the 12 volt charging mode to the 24 volt charging mode. The field current for field winding 14 can be supplied via a circuit that includes the three diodes 34, the field winding 14, the collector-emitter circuit of transistor 36 to ground, and then back to the terminals 18, 20 and 22 via the anode-cathode circuits of the controlled rectifiers 72 when they are gated conductive. When the controlled rectifiers 72 are nonconductive, the path for field current is from the grounded emitter of transistor 36 to grounded terminal 52, through battery 54, through conductor 58, and then through diodes 26 to terminals 18, 20 and 22. When the system is going from the 12 volt to the 24 volt mode, the current developed by the generator and applied to the field winding 14 via diodes 34 may not be sufficient to obtain a fast build-up of generator voltage. Full field power is available, however, since the battery 50 can supply field current to the field winding 14 via a circuit that can be traced from the positive side of the battery 50, through diode 88 to terminal 32, through the field winding 14 and collector-emitter circuit of transistor 36 to ground, and then through grounded terminal 52 to the negative side of battery 50. The diode 88 prevents current flow from junction 32 to conductor 86 as a result of the voltage developed at junction 32 by the diodes 34.

In regard to the operation of the fixed frequency control 84A, shown in FIG. 4, it is pointed out that amplifier B1 has a constant voltage applied to its positive terminal due to the provision of Zener diode 128. The voltage applied to the negative terminal of amplifier B1 varies, dependent upon the voltage across battery 54, since battery voltage is applied across the circuit comprised of diode 120, resistor 118 and potentiometer resistor 116. Battery voltage is filtered by capacitor 137 to obtain an average direct voltage level that is applied to the negative input terminal of amplifier B1 via junction 114 and this voltage is compared to the Zener reference voltage applied to the positive input terminal of amplifier B1. The circuit establishes the time ratio between the 12 and 24 volt modes for the existing load conditions that will hold the average direct voltage at junction 114 and the negative terminal of amplifier B1 substantially constant. The variation in time ratios, for certain load current conditions and conditioned battery voltages $V_1$ and $V_2$, is illustrated in FIGS. 6B and 6C. FIGS. 6B and 6C are generalized waveforms and are intended only to illustrate the general concept of varying the time ratios with different conditions of operation. Further, and by way of example, the frequency of the triangular waveform voltage generator, comprised of amplifier sections B2 and B3, may be about 25 to 30 hertz.

As has been described, the switching from 12 and 24 volt modes and vice versa can be controlled by the fixed frequency mode control 84A, shown in FIG. 4, or alternatively by the load determined control 84B shown in FIG. 5. It is preferred to utilize the fixed frequency control 84A since the switching frequency can be selected to be high enough to prevent any possibility of light flicker of the vehicle headlamps. Thus, when the load determined control 84B is utilized, the switching between modes may occur at such a low frequency as to cause a slight light flicker. The fixed frequency mode switching control 84A is also considered to be superior to the load determined control 84B in that the ripple voltage applied to the batteries is less when using the fixed frequency mode switching control 84A.

The following describes the types of motor vehicle loads that can be supplied by the electrical system of this invention. Examples of the 24 volt loads 68 are the electric motor driven engine radiator cooling fan and the rear window heater. Examples of the +12 volt loads 60 are the vehicle headlamps, radio, and other vehicle lamps. The electric engine cranking motor can be the −12 volt load 64. On the other hand, if a 24 volt electric cranking motor is utilized, it can be energized across terminals 48 and 56.

One of the advantages of providing a system which can supply both a positive and negative 12 volts referenced to ground is that it simplifies the circuitry required to energize reversible direct voltage electric motors that are used on motor vehicles. Thus, one end of a motor can be connected to ground and a single-pole double-throw switch connected between the opposite end of the motor and respective positive and negative terminals 48 and 56. The direction of the current flow through the motor will then be dependent upon whether terminal 48 or terminal 56 is connected to the motor by the switch. When switching from terminal 48 to 56 or vice versa, the current in the motor will reverse.

The batteries 50 and 54 are illustrated in FIG. 1 as two separate batteries. Batteries 50 and 54 could be provided in a single case or package that would have a positive terminal corresponding to junction 48, a negative terminal corresponding to junction 56, and an intermediate terminal corresponding to junction 52.

The embodiments of the invention for which an exclusive property or privilege is claimed are defined as follows:

1. A battery charging system for a multivoltage motor vehicle electrical system comprising, first and second storage batteries, an alternating current generator having a polyphase output winding, a bridge rectifier having AC input terminals connected to said output winding and direct voltage output terminals, means connecting said batteries in series and across said direct voltage output terminals of said bridge rectifier, the negative terminal of one battery and the positive terminal of the other battery being connected to common terminal means, a plurality of controlled rectifiers having their anode-cathode circuits connected between said output winding and said common terminal means whereby only one of said batteries is charged by said generator when said controlled rectifiers are gated conductive, a ramp voltage generator, means for developing a control voltage that is a function of the voltage across the battery that is not charged when said controlled rectifiers are conductive, and means responsive to the relative magnitudes of the ramp voltage developed by said ramp voltage generator and control voltage for causing said controlled rectifiers to be gated on and off at the frequency of said ramp voltage generator.

2. A battery charging system for a motor vehicle comprising, first and second storage batteries, means connecting said batteries in series with the negative terminal of one battery and the positive terminal of the other battery connected together and to a common junction, an alternating current generator driven by the engine of said vehicle having a polyphase output winding, a polyphase full-wave bridge rectifier having AC input terminals connected to said output winding and direct voltage output terminals, means connecting said batteries across said direct voltage output terminals whereby in a first charging mode said batteries are charged in series by the direct voltage output of said bridge rectifier, a circuit including a switching means for connecting said output winding to said common junction operative to charge only one of said batteries from said generator when said switching means is conductive to thereby place said system in a second battery charging mode, a triangular waveform voltage generator developing a triangular voltage having a constant frequency, and comparator means coupled to said switching means responsive to the relative magnitudes of said triangular voltage and a direct voltage that is a function of the voltage across the battery that is not charged when said switching means is conductive for causing said system to operate alternately between said first and second charging modes at the frequency of said triangular waveform voltage generator, the time period that said system is in each mode being a function of said relative voltage magnitudes.

3. A battery charging system for a motor vehicle comprising, first and second storage batteries, means connecting said batteries in series with the negative terminal of one battery and the positive terminal of the other battery connected together and to a common junction, an alternating current generator driven by the engine of said vehicle having a polyphase output winding, a polyphase full-wave bridge rectifier having AC input terminals connected to said output winding and direct voltage output terminals, means connecting said batteries across said direct voltage output terminals whereby in a first charging mode said batteries are charged in series by the direct voltage output of said bridge rectifier, a circuit including a switching means for connecting said output winding to said common junction operative to charge only one of said batteries from said generator when said switching means is conductive to thereby place said system in a second battery charging mode, means connected to said switching means operative to cause said charging system to operate alternately between said first and second charging modes, and means for maintaining said system in said second charging mode until generator speed exceeds a predetermined value.

4. A battery charging system for a motor vehicle comprising, first and second storage batteries, means connecting said batteries in series with the negative terminal of one battery and the positive terminal of the other battery connected together and to a common junction, an alternating current generator driven by the engine of said vehicle having a polyphase output winding, a polyphase fullwave bridge rectifier having AC input terminals connected to said output winding and direct output terminals, means connecting said batteries across said direct voltage output terminals whereby in a first charging mode said batteries are charged in series by the direct voltage output of said bridge rectifier, a circuit including a plurality of controlled rectifiers connecting said output winding to said common junction operative to charge only one of said batteries from said generator when said controlled rectifiers are conductive to thereby place said system in a second battery charging mode, means connected to said controlled rectifiers operative to cause said charging system to operate alternately between said first and second charging modes, and means for maintaining said system in said second charging mode until generator speed exceeds a predetermined value.

5. A battery charging system for a motor vehicle comprising, first and second storage batteries, means connecting said batteries in series with the negative terminal of one battery and the positive terminal of the other battery connected together and to a common junction, an alternating current generator having a field winding and a polyphase output winding, a polyphase full-wave bridge rectifier having AC input terminals connected to said output winding and direct voltage output terminals, means connecting said batteries across said direct voltage output terminals whereby in a first charging mode the batteries are charged in series by the direct voltage output of said bridge rectifier, a circuit including a plurality of controlled rectifiers connecting said output winding to said common junction operative to charge only one of said batteries from said generator when said controlled rectifiers are gated conductive to thereby place said system in a second battery charging mode, means connected to said controlled rectifiers operative to cause said charging system to operate alternately between said first and second charging modes, a voltage regulator including switching means and a voltage sensing circuit, means connecting said sensing circuit across one of said batteries, said switching means being biased conductive and nonconductive in accordance with variation in the voltage sensed by said sensing circuit, a plurality of field current supply diodes connected between said output winding and a field supply terminal, means connecting said field winding and said switching means of said voltage regulator in series and to said field supply terminal, and a diode connected between one of said batteries and field supply terminal poled to supply current to said field winding from said battery.

6. A battery charging system for a motor vehicle comprising, first and second storage batteries, means connecting said batteries in series with the negative terminal of one battery and the positive terminal of the other battery connected together and to a common junction, an alternating current generator driven by the engine of said vehicle having a polyphase output winding, a polyphase full-wave bridge rectifier having AC input terminals connected to said output winding and direct voltage output terminals, means connecting said batteries across said direct voltage output terminals whereby in a first charging mode said batteries are charged in series by the direct voltage output of said bridge rectifier, a circuit including switching means for connecting said output winding to said common junction operative to charge only one of said batteries from said generator when said switching means is conductive to thereby place said system in a second battery charging mode, means connected to said switching means operative to cause said charging system to operate alternately between said first and second charging modes, means responsive to the frequency of the voltage developed at a phase terminal of said output winding for maintaining said system in said second charging mode until said frequency exceeds a predetermined value, a generator voltage warning lamp, and means responsive to the amplitude of the voltage developed at said phase terminal for extinguishing said lamp when the amplitude of said voltage reaches a predetermined value.

7. A motor vehicle electrical system for providing a first load supply voltage having a first polarity referenced to ground, a second load supply voltage of an opposite polarity referenced to ground and a third load supply voltage substantially equal to the sum of said first and second voltages comprising, first and second storage batteries, means connecting the negative terminal of one of said batteries and the positive terminal of the other battery together and to ground, an alternating current generator having a polyphase output winding, a polyphase full-wave bridge rectifier having AC input terminals connected to said output winding and direct voltage output terminals, conductor means which are not electrically connected to ground connecting said batteries across the direct voltage output terminals of said bridge rectifier whereby said batteries can be charged in series from direct voltage output terminals, a plurality of controlled rectifiers, each having an anode and a cathode, means connecting the anode-cathode circuits of said controlled rectifiers between the phase terminals of said output winding and ground with one of said anodes or cathodes of said controlled rectifiers all being connected to ground, means for periodically gating said controlled rectifiers conductive to thereby cause only one of said batteries to be charged from said output winding, first and second electrical loads one end of each being connected to ground, means for connecting respective opposite ends of said loads with respective positive and negative terminals of respective batteries, and a third electrical load connectable across said series-connected batteries.

\* \* \* \* \*